(12) United States Patent
Fan et al.

(10) Patent No.: US 11,982,166 B2
(45) Date of Patent: May 14, 2024

(54) SYSTEM FOR SEGMENTED SIMULTANEOUS WATER INJECTION AND OIL RECOVERY THROUGH DOUBLE PIPES IN HORIZONTAL SECTION

(71) Applicant: Nanniwan Oil Production Plant, Yanchang Oilfield Co., Ltd., Yan'an (CN)

(72) Inventors: Pingtian Fan, Yan'an (CN); Yuetian Liu, Yan'an (CN); Weichu Yu, Yan'an (CN); Ping Li, Yan'an (CN); Yongdong Wang, Yan'an (CN); Ying Zhang, Yan'an (CN); Baolin Guan, Yan'an (CN); Fengping Yan, Yan'an (CN); Yuanping Hu, Yan'an (CN); Min Sun, Yan'an (CN)

(73) Assignee: Nanniwan Oil Production Plant, Yanchang Oilfield Co., Ltd., Yan'an (CN)

( * ) Notice: Subject to any disclaimer, the term of this patent is extended or adjusted under 35 U.S.C. 154(b) by 82 days.

(21) Appl. No.: 17/940,602

(22) Filed: Sep. 8, 2022

(65) Prior Publication Data
US 2023/0366302 A1    Nov. 16, 2023

(30) Foreign Application Priority Data

May 13, 2022   (CN) .......................... 202210523436.3

(51) Int. Cl.
*E21B 43/20*    (2006.01)
*E21B 17/07*    (2006.01)
(Continued)

(52) U.S. Cl.
CPC .............. *E21B 43/20* (2013.01); *E21B 17/07* (2013.01); *E21B 33/1285* (2013.01); *E21B 34/08* (2013.01)

(58) Field of Classification Search
CPC ...... E21B 43/20; E21B 17/07; E21B 33/1285; E21B 34/08
See application file for complete search history.

(56) References Cited

U.S. PATENT DOCUMENTS

6,318,469 B1 * 11/2001 Patel ....................... E21B 43/12
166/305.1
6,481,503 B2 * 11/2002 Hamilton .............. E21B 43/162
166/313
(Continued)

*Primary Examiner* — D. Andrews
(74) *Attorney, Agent, or Firm* — Zhigang Ma (57) ABSTRACT

Disclosed is a system for segmented simultaneous water injection and oil recovery through double pipes in horizontal section, comprising several packers, several oil-extracting mechanisms and several water-injection mechanisms, wherein each of the packers, each of the oil-extracting mechanisms, and each of the water-injection mechanisms has an injection channel and a production channel, when several packers, several oil-extracting mechanisms and several water-injection mechanisms are combined, each of the injection channels is connected in turn, and each of the production channels is also connected in turn, the oil-extracting mechanism can extract oil through the production channel, the water-injection mechanism can inject water through the injection channel. The beneficial effects of this disclosure include: the oil in the oil production section can be produced while the water injection section is injected with water. The cost of water injection is effectively reduced, the efficiency of water injection is improved.

9 Claims, 11 Drawing Sheets

(51) Int. Cl.
*E21B 33/128* (2006.01)
*E21B 34/08* (2006.01)

(56) References Cited

U.S. PATENT DOCUMENTS

| | | | |
|---|---|---|---|
| 10,890,057 B2* | 1/2021 | MacPhail | E21B 33/13 |
| 2022/0082001 A1* | 3/2022 | Balan | E21B 33/12 |

* cited by examiner

SYSTEM FOR SEGMENTED SIMULTANEOUS WATER INJECTION AND OIL RECOVERY THROUGH DOUBLE PIPES IN HORIZONTAL SECTION

FIELD OF THE DISCLOSURE

The disclosure relates to the technical field of oil recovery, in particular to a system for segmented simultaneous water injection and oil recovery through double pipes in horizontal section.

BACKGROUND

The heterogeneity of the oil layer makes the lateral permeability, connectivity and oil saturation of horizontal sections vary greatly. There is only a single channel in the existing injection and production tools, therefore, a single well is only used as a water injection well or as an oil production well, and therefore water injection and oil production cannot be performed simultaneously in a single well.

When the reservoir energy is low, water injection must be used for oil extraction. For water injection extraction, one well is required as a water injection well and the other as an oil production well. For horizontal wells, the drilling cost of a well is high. Using the traditional injection and production process requires at least two wells, which results in high production costs and relatively poor production timeliness.

SUMMARY

The purpose of this disclosure is to overcome the above technical deficiencies and provide a system for segmented simultaneous water injection and oil recovery through double pipes in horizontal section to solve the technical problems of high production cost and poor production timeliness of the existing injection-production tools.

This disclosure provides a system for segmented simultaneous water injection and oil recovery through double pipes in horizontal section, comprising several packers, several oil-extracting mechanisms and several water-injection mechanisms, wherein each of the packers, each of the oil-extracting mechanisms, and each of the water-injection mechanisms has an injection channel and a production channel, when several packers, several oil-extracting mechanisms and several water-injection mechanisms are combined, each of the injection channels is connected in turn, and each of the production channels is also connected in turn, the oil-extracting mechanism can extract oil through the production channel, the water-injection mechanism can inject water through the injection channel, wherein, each of the oil-extracting mechanisms is arranged between two adjacent packers, and each of the water-injection mechanisms is also arranged between two adjacent packers.

The beneficial effects of this disclosure include: when in use, determining the quantity and installation sequence of packers, oil-extracting mechanisms, and water-injection mechanisms according to actual needs. Then, according to the preset installation sequence, running each packer, oil-extracting mechanism, and water-injection mechanism into the well section in turn. After the running is completed, the oil-extracting mechanism is located in the oil production section, the water-injection mechanism is located in the water injection section, and both ends of the oil production section and the water injection section are provided with packers. Then, each packer is seated, and then each oil-extracting mechanism is used to produce oil through the production channel, and then water is injected into the injection channel, and the injected water is injected into the formation through the water-injection mechanism, thereby supplementing energy for the formation. Therefore, through the injection-production system, the oil in the oil production section can be produced while the water injection section is injected with water, that is, the simultaneous implementation of oil production and water injection can be achieved through a single well. The cost of water injection is effectively reduced, the efficiency of water injection is improved, and the producing efficiency is increased at the same time.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Please refer to FIG. 1-FIG. 14, this disclosure provides a system for segmented simultaneous water injection and oil recovery through double pipes in horizontal section, comprising several packers 1, several oil-extracting mechanisms 2 and several water-injection mechanisms 3. Each of the packer 1, each of the oil-extracting mechanism 2 and each of the water-injection mechanism 3 has an injection channel and a production channel, when several packers 1, several oil-extracting mechanisms 2 and several water-injection mechanisms 3 are connected, each of the injection channels is connected in turn, and each of the production channels is also connected in turn. The oil-extracting mechanism 2 can recover oil through the production channel, while the water-injection mechanism 3 can inject water through the injection channel, wherein each of the oil-extracting mechanisms 2 is arranged between two adjacent packers 1, and each of the water-injection mechanisms 3 is also arranged between two adjacent packers 1.

When in use, determining the quantity and installation sequence of packers 1, the oil-extracting mechanisms 2 and the water-injection mechanisms 3 according to actual needs.

Figure 14:
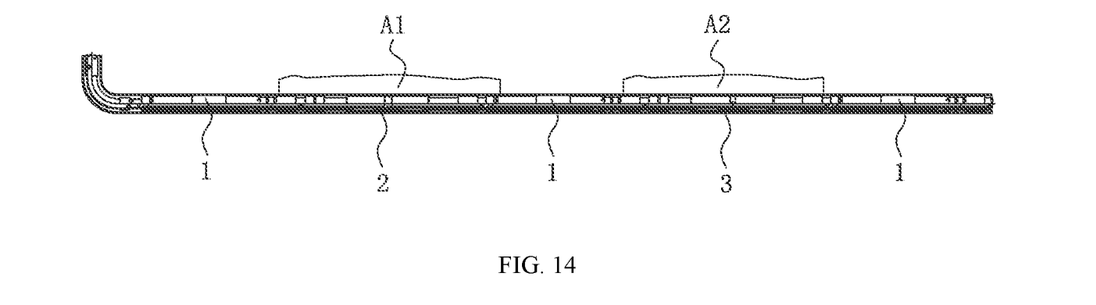
FIG. 14 is a diagram of the use status of system for segmented simultaneous water injection and oil recovery through double pipes in horizontal section in FIG. 1.

Then running each packer 1, each oil-extracting mechanism 2 and each water-injection mechanism 3 into the well section in sequence according to the preset installation sequence. After the running is completed, the oil-extracting mechanism 2 is located in oil production section A1, the water-injection mechanism 3 is located in water injection section A2, and both ends of the oil production section A1 and the water injection section A2 are provided with packers 1. Then, each packer 1 is seated, and then each oil-extracting mechanism 2 is used to produce oil through the production channel, and then water is injected into the injection channel, and the injected water is injected into the formation through water-injection mechanism 3, thereby supplementing energy for the formation. Therefore, through the injection-production system, the oil in the oil production section A1 can be produced while the water injection section A2 is injected with water, that is, the simultaneous implementation of oil production and water injection can be realized through a single well, which effectively reduces the water injection cost and improves the water injection efficiency.

In order to specifically realize the function of the packer 1, please refer to FIG. 2-FIG. 6. In a preferred embodiment, the packer 1 includes a central tube 13 and a first inner tube 14, the two ends of the central tube 13 are respectively connected with the first inner tube upper joint 11 and the first inner tube lower joint 115 threadedly, the first outer pipe upper joint 12 is fixed on the shoulder of the first inner tube upper joint 11, there is a first gap 124 between the first outer pipe upper joint 12 and the first inner tube upper joint 11, a number of first flow holes 125 are opened on the first inner tube upper joint 11, the first flow hole 125 is used to connect a second gap 126 between the central tube 13 and the first inner tube 14, a second flow hole 130 is opened on the first inner tube lower joint 115, the central tube 13 is equipped with an expandable cartridge 111, and the two ends of the expandable cartridge 111 are respectively connected with a rubber barrel upper sheath 19 and a rubber barrel lower sheath 112 threadedly, a third gap 128 is formed between the central tube 13 and the expandable cartridge 111, the rubber barrel upper sheath 19 is equipped with the first outer pipe upper joint 12, the rubber barrel lower sheath 112 is equipped with a first outer pipe lower joint 114, a fourth gap 131 is formed between the first outer pipe lower joint 114 and the first inner tube lower joint 115, the two ends of the central tube 13 are respectively distributed with at least 3 holes along the circumferential direction, the corresponding two ends of the first inner tube 14 are provided with a number of lobes 119, the lobes 119 are provided with a diversion hole 127, the diversion hole 127 is equipped with a set and lock capsule 16, the set and lock capsule 16 is compressed by a threaded engagement of a capsule bolt 15 with a capsule cap 17, the set and lock capsule 16 is used to seal each of the diversion holes 127, several unsealing pins 113 are installed on the rubber barrel lower sheath 112, the unsealing pin 113 fits with the corresponding groove on the first outer pipe lower joint 114.

In this embodiment, the first inner tube upper joint 11 is connected to the oil pipe, the first gap 124 is connected with the water injection pipeline, after the packers 1 run down to the predetermined position, increasing the pressure in the oil pipe, the high-pressure medium pushes open the set and lock capsule 16 through a set of diversion holes 127 in the circumferential direction through the lobes 119, and enters the third gap 128 between the central tube 13 and the expandable cartridge 111 to support the expandable cartridge 111 to expand; at the same time, the high pressure medium pushes the rubber barrel lower sheath 112 through another group of diversion holes 127 in the circumferential direction of the lobes 119 to compress the expandable cartridge 111 to expand it, and complete the sealing; Next, releasing the pressure in the oil pipe, and the set and lock capsule 16 seals the high-pressure medium between the central tube 13 and the expandable cartridge 111 to realize self-locking.

Figure 1:
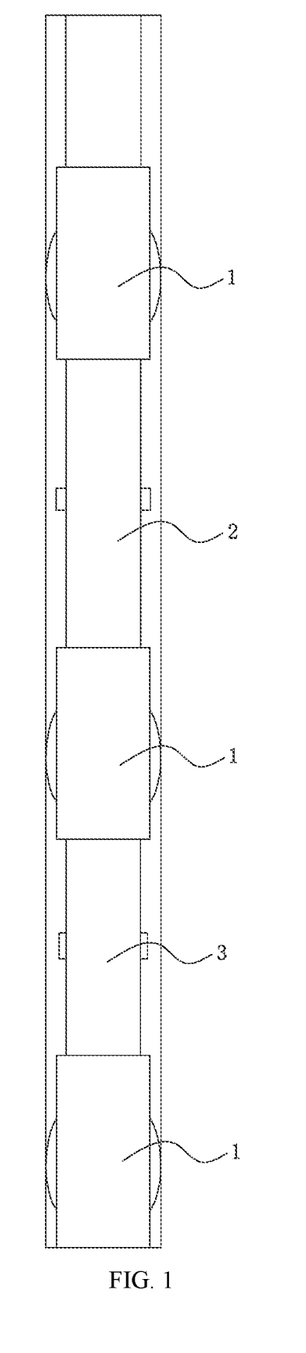
FIG. 1 is the schematic diagram of the structure of an embodiment of system for segmented simultaneous water injection and oil recovery through double pipes in horizontal section provided by this disclosure.
Figure 2:
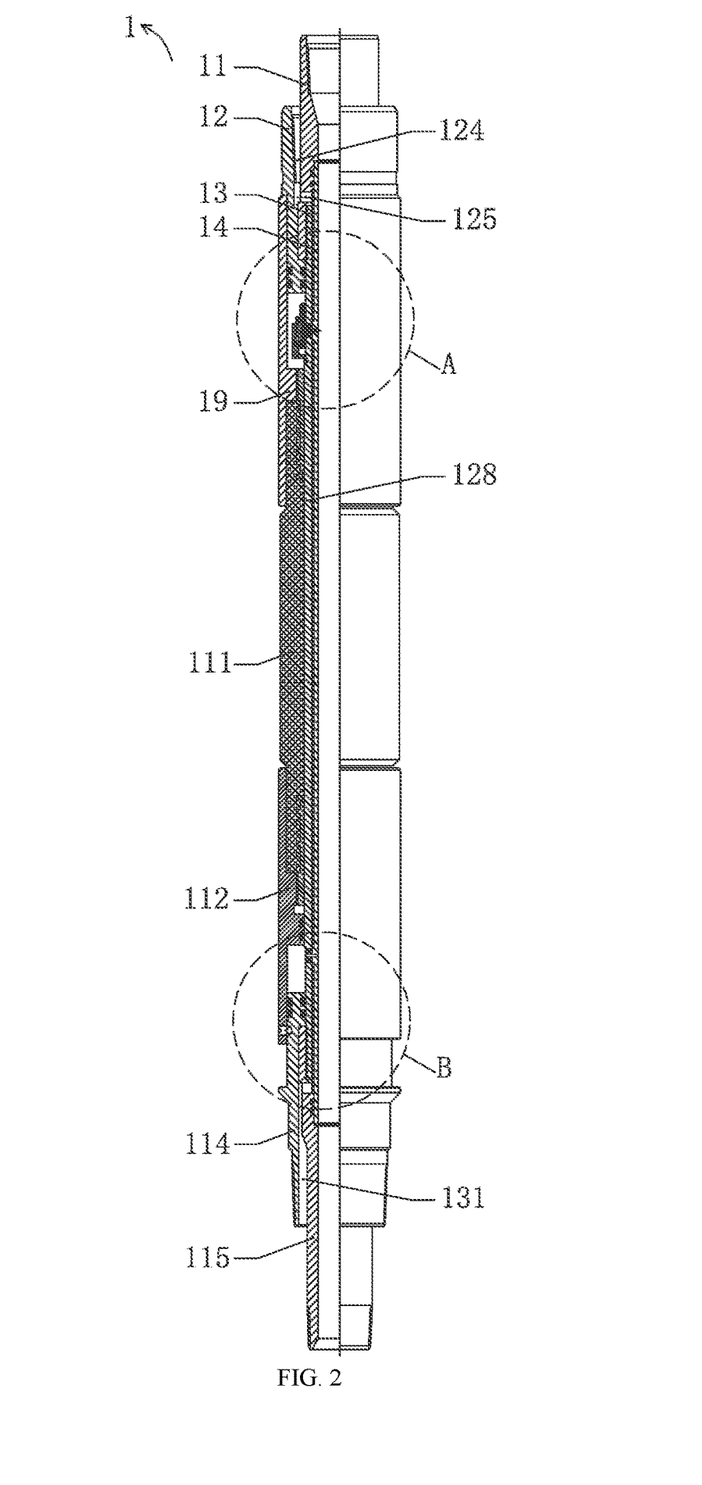
FIG. 2 is the half-section view of the packer in FIG. 1 in the state of downhole.
Figure 3:
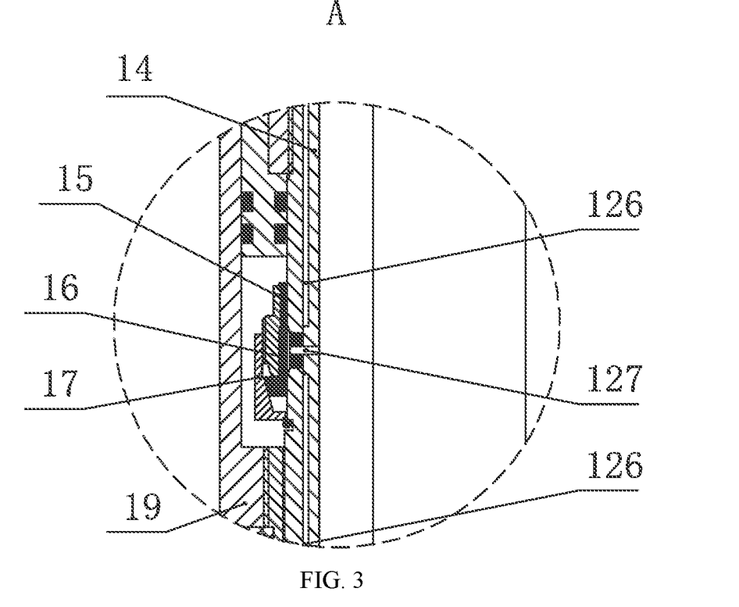
FIG. 3 is the partial enlarged view of area A in FIG. 2.
Figure 4:
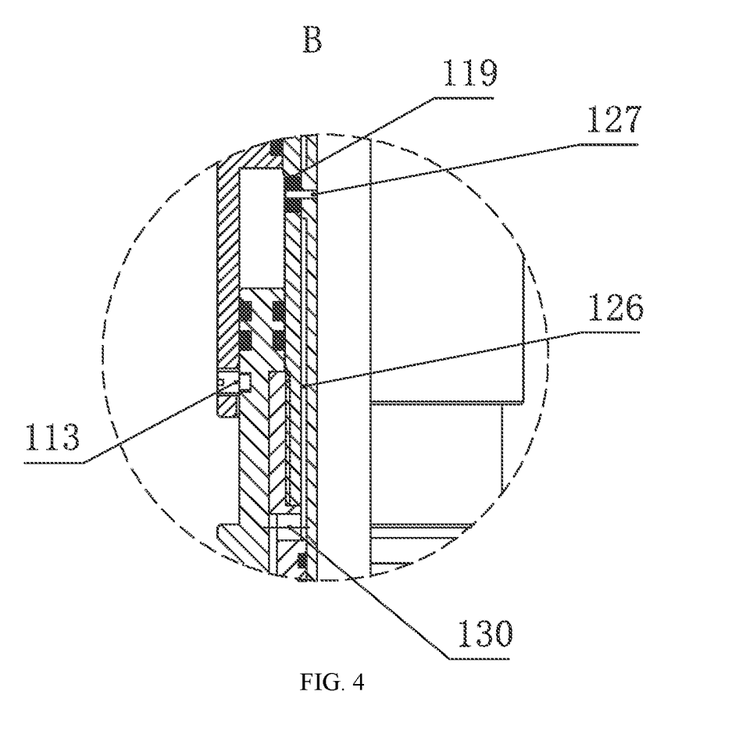
FIG. 4 is the partial enlarged view of area B in FIG. 2.
Figure 5:
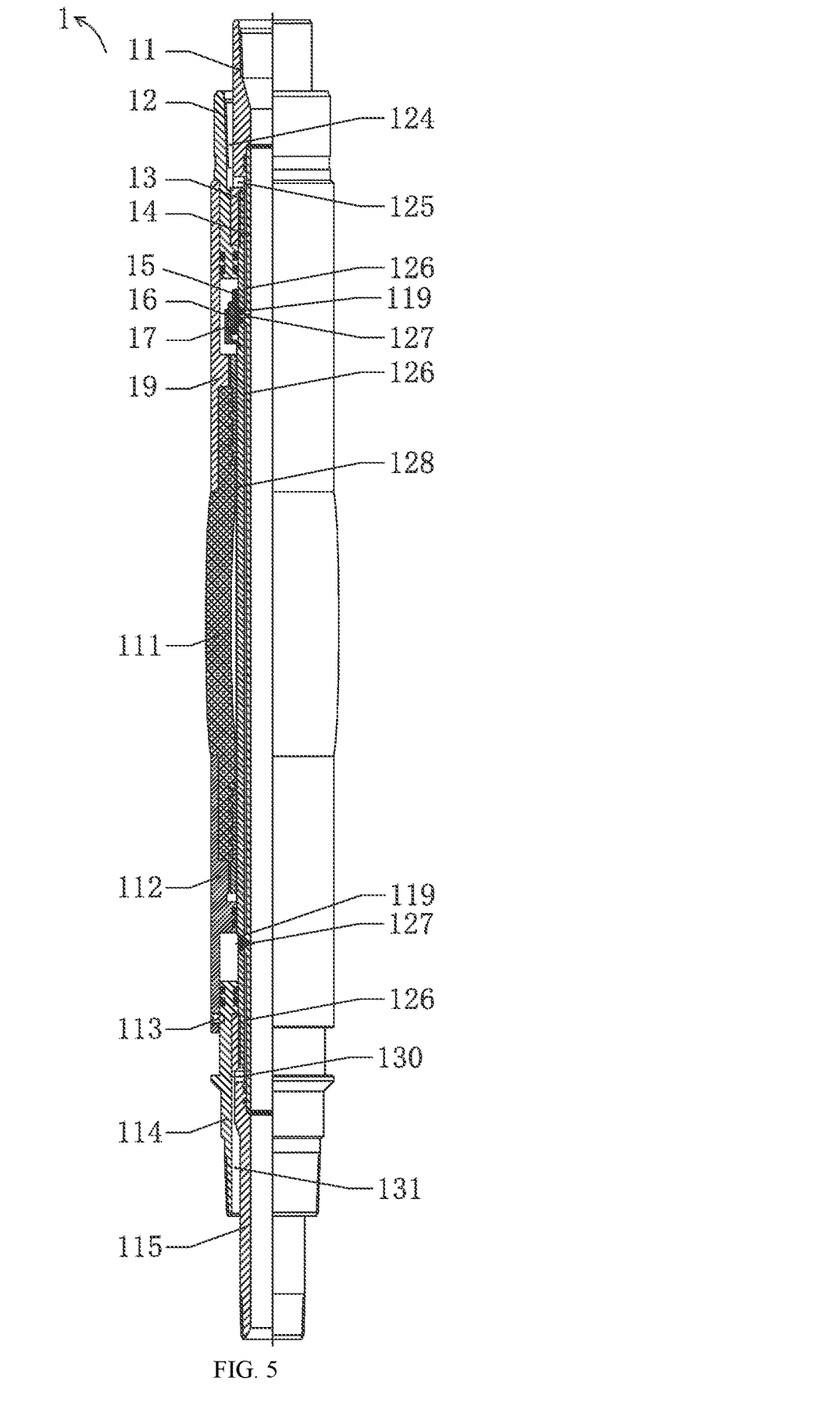
FIG. 5 is the half-section view of the packer in FIG. 2 in the seated state.
Figure 6:
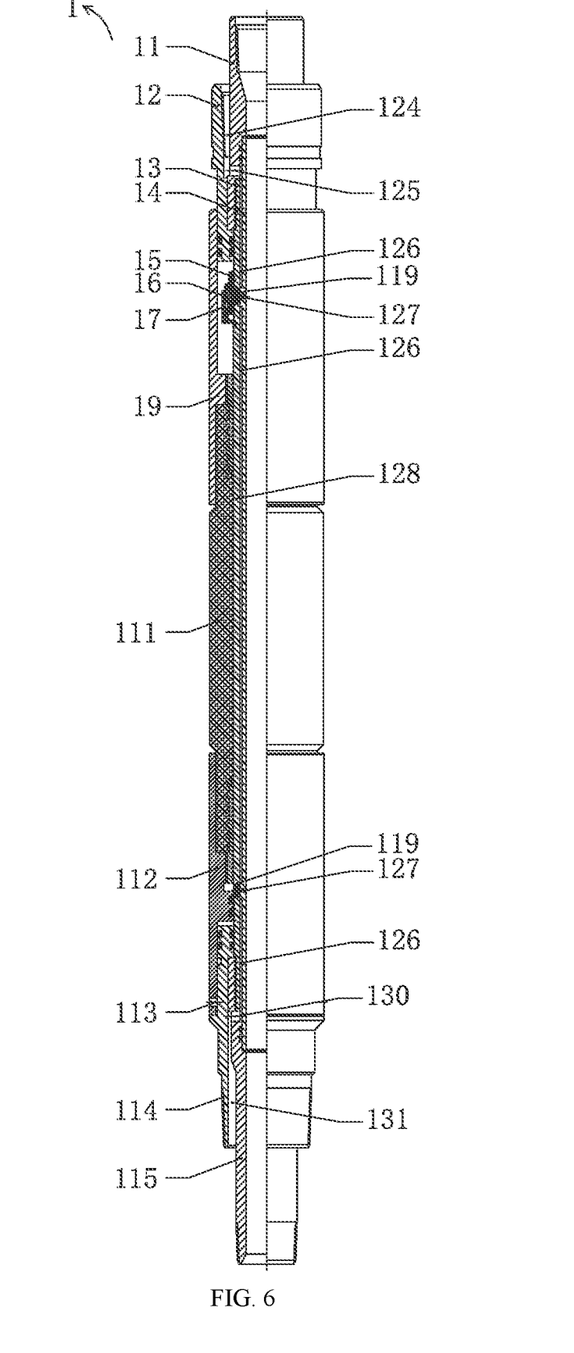
FIG. 6 is the half-section view of the packer in FIG. 2 in the state of lifting and unsealing.

When tripping out, lifting the pipe string, the friction between the expandable cartridge 111 and the inner wall of the casing causes relative displacement between rubber barrel upper sheath 19, expandable cartridge 111, rubber barrel lower sheath 112, first inner tube upper joint 11, central tube 13, first inner tube 14, set and lock capsule 16, capsule bolt 15, capsule cap 17, first inner tube lower joint 115, which can cut the unsealing pins 113, the rubber barrel lower sheath 112 goes over the diversion hole 127, so that the third gap 128 between the central tube 13 and the expandable cartridge 111 is connected to the first inner tube 14, then, high pressure medium flows into the first inner tube 14 under the action of the pressure difference, the expandable cartridge 111 loses the internal pressure support, and retracts and unseals the pipe string by its own elastic force.

Therefore, the packer 1 provided by this disclosure is connected with the inner and outer pipes of the horizontal section to form two independent liquid flow channels, and has the functions of oil pipe holding back and setting, low setting pressure, large rubber cylinder area, good sealing effect, suitable for kerf or open-hole sealing, self-locking after setting, and unsealing by lifting.

In order to improve the effect of the first flow holes 125, please refer to FIG. 2 to FIG. 6, in a preferred embodiment, at least six first flow holes 125 are opened on the first inner tube upper joint 11.

In order to improve stability, please refer to FIG. 2-FIG. 6, in a preferred embodiment, at least 6 unsealing pins 113 are installed on the rubber barrel lower sheath 112.

In order to improve the use effect, please refer to FIG. 2 to FIG. 6, in a preferred embodiment, at least three lobes 119 are disposed on each end of the corresponding first inner tube 14.

In order to specifically realize the function of the oil-extracting mechanism 2, please refer to FIG. 7-FIG. 11, in a preferred embodiment, the oil-extracting mechanism 2 comprises a second inner pipe upper joint 21, a second inner tube lower joint 210 and a second outer pipe upper joint 22, the second inner pipe upper joint 21 is threadedly connected with a first shunt body 28, the second inner pipe upper joint 21 is sleeved with a first upper telescopic outer tube 23, there is a fifth gap 219 between the second inner pipe upper joint 21 and the first upper telescopic outer tube 23, the second outer pipe upper joint 22 is threadedly connected with the first upper telescopic outer tube 23, the first upper telescopic outer tube 23 is equipped with a first working cylinder 24, the first working cylinder 24 is screwed with the first shunt body 28, there is a sixth gap 220 between the first working cylinder 24 and the second inner pipe upper joint 21, the second inner tube lower joint 210 is threadedly connected with the first shunt body 28, the first shunt body 28 is screwed with a first working cylinder 29, there is a seventh gap 224 between the first working cylinder 29 and the second inner tube lower joint 210, the first working cylinder 29 contains a first lower telescopic outer tube 211, there is an eighth gap 225 between the first lower telescopic outer tube 211 and the second inner tube lower joint 210, the first shunt body 28 is provided with a number of oil production valve holes 221 along the axis direction, a number of first water injection holes 223 are symmetrically distributed on both sides of the oil production valve hole 221, the oil production valve hole 221 communicates with oil overflow holes 222 arranged in the circumferential direction, the oil production valve hole 221 is equipped with a vale spring cap 25, the vale spring cap 5 presses a vale spring 26 and a ball 27, The vale spring cap 25 is screwed with the first shunt body 28.

In this embodiment, during oil production, oil flows through the oil overflow holes 222 distributed in the circumferential direction on the first shunt body 28 to push up the ball 27, compressing the val spring 26. In this way, the inner diameter expansion part of the first shunt body 28 is released, and the oil flows through the mechanical production pipe string connected to the second inner pipe upper joint 21 and is lifted to the wellhead, thereby realizing the oil production function.

Figure 7:
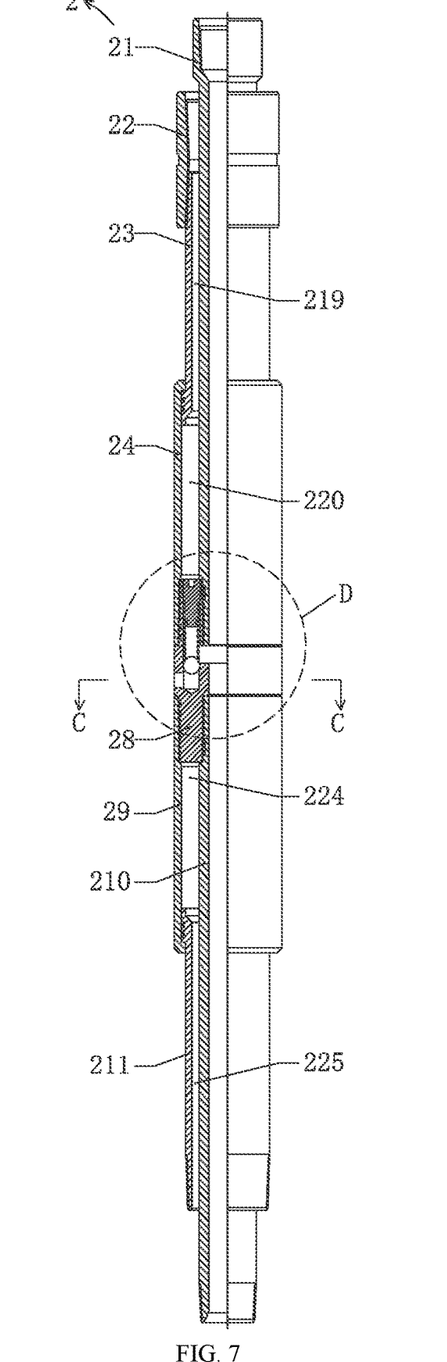
FIG. 7 is a half-section view of the oil-extracting mechanism in FIG. 1 in a closed state.
Figure 8:
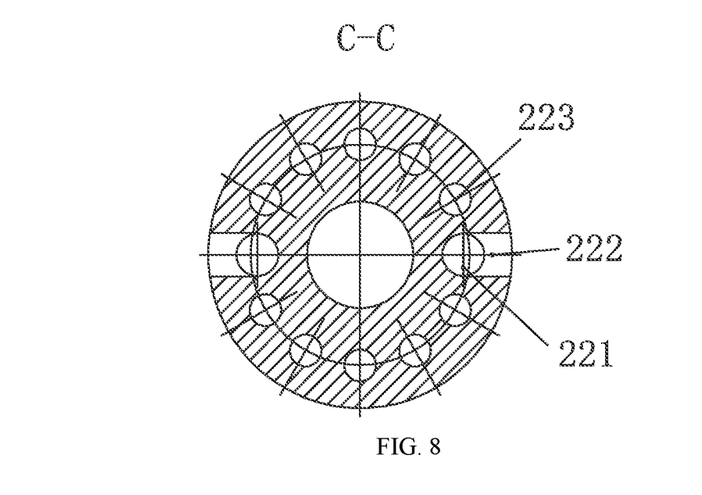
FIG. 8 is the sectional view of section C-C in FIG. 7.
Figure 9:
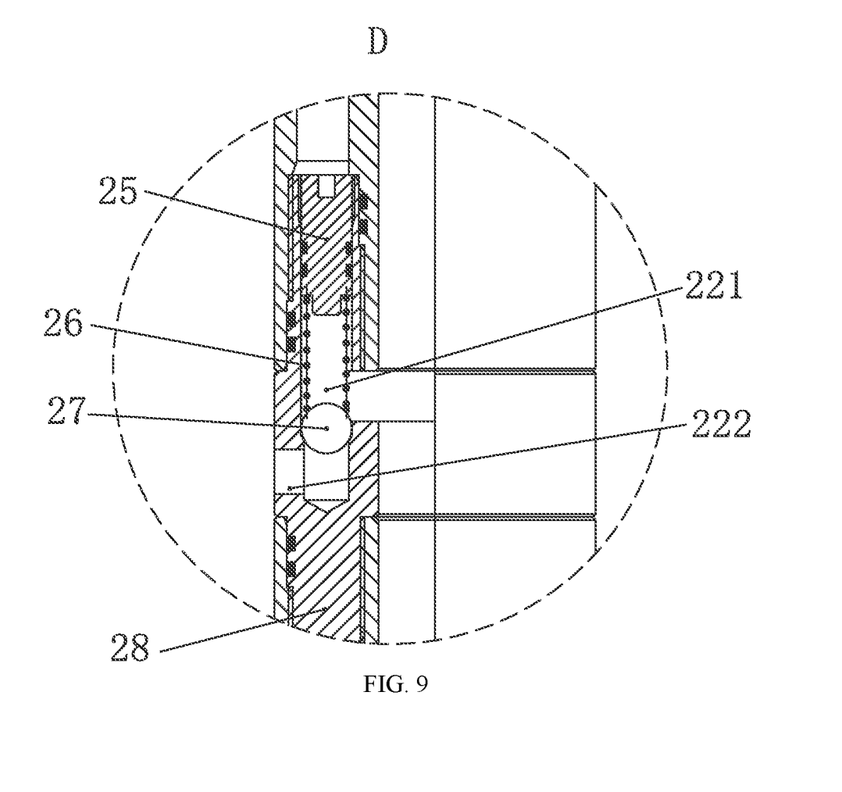
FIG. 9 is the partial enlarged view of area D in FIG. 7.
Figure 10:
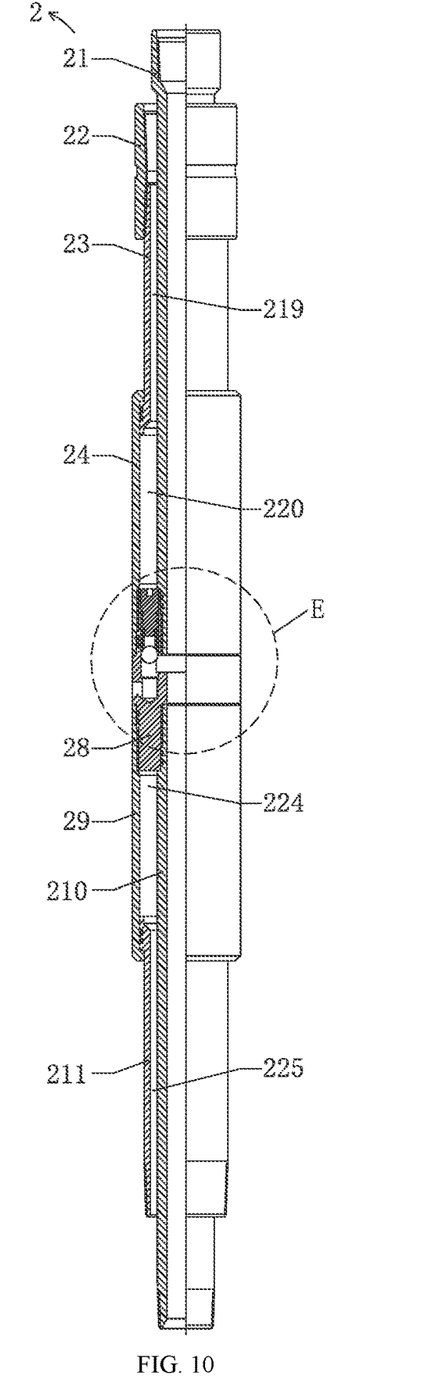
FIG. 10 is a half-section view of the oil-extracting mechanism in FIG. 7 in an open state.
Figure 11:
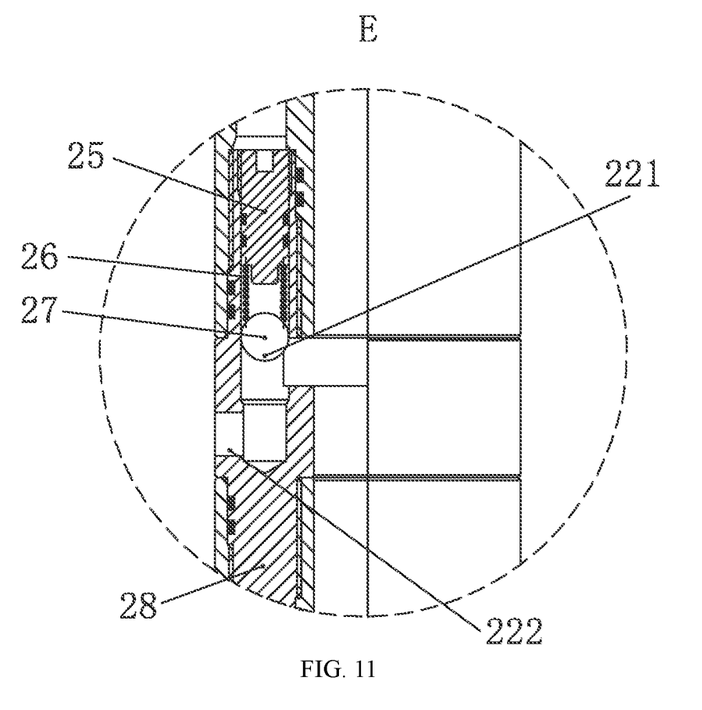
FIG. 11 is a partial enlarged view of region E in FIG. 10.

At the same time, in order to assist packer 1 to seal, oil-extracting mechanism 2 is closed when going downhole, when sealing the packer 1, increasing pressure in the oil pipe, the pressure acts on the ball 27 through the inner diameter expansion part of first shunt body 28, and pressing the ball 27 to seal, so that the packer 1 can obtain sufficient sealing pressure.

The oil-extracting mechanism 2 provided by this disclosure has two independent liquid flow channels formed by connecting with the packer 1, the second inner tube is fixed, which is conducive to depth positioning, and the second outer tube can be telescopically adjusted, which is convenient for pipe string connection. When increasing the pressure of the oil pipe, the oil production valve hole 221 is closed to ensure the reliable sealing of the packer, the low starting pressure of the ball 27 is beneficial to oil production, and the double-single flow valve can provide a large enough flow cross-section for the produced fluid.

In order to improve the use effect of the oil production valve hole 221, please refer to FIG. 7-FIG. 11, in a preferred embodiment, the first shunt body 28 is provided with at least two oil production valve holes 221 along the axial direction.

In order to improve the use effect of the first water injection hole 223, please refer to FIG. 7-FIG. 11, in a preferred embodiment, at least 10 first water injection holes 223 are symmetrically distributed on both sides of the oil production valve hole 221.

Figure 12:
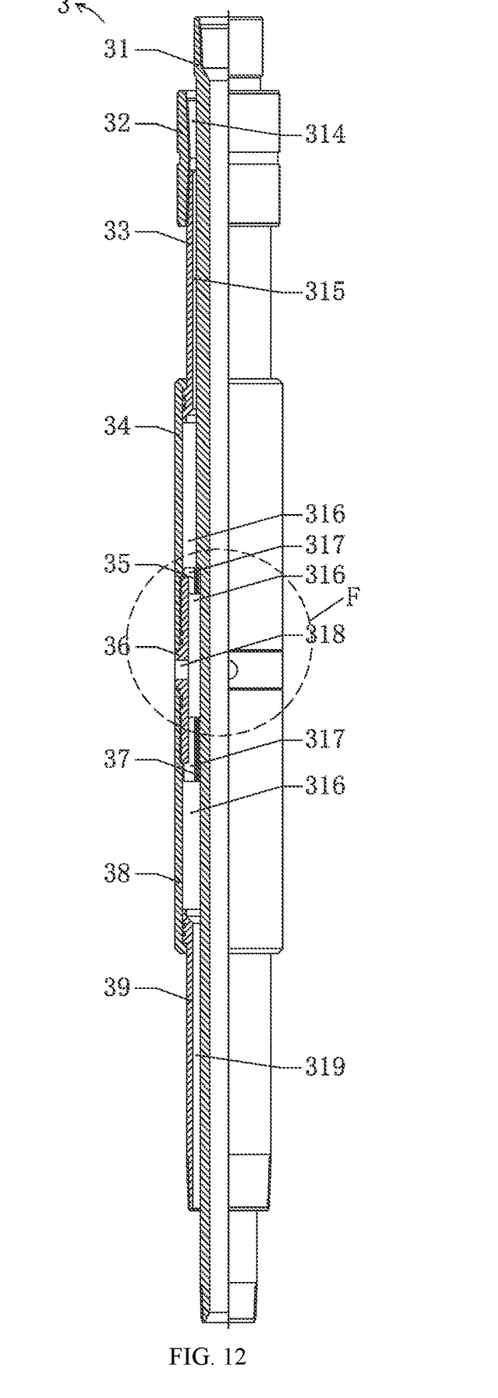
FIG. 12 is a half-section view of the water-injection mechanism in FIG. 1.
Figure 13:
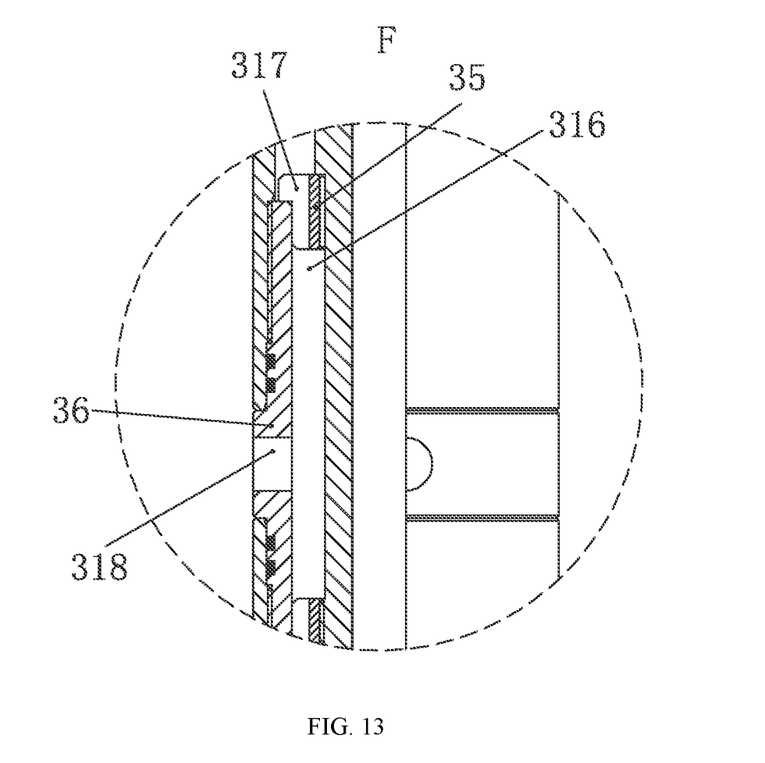
FIG. 13 is a partial enlarged view of region F in FIG. 12.

In order to specifically realize the function of the water-injection mechanism 3, please refer to FIG. 12 and FIG. 13, in a preferred embodiment, the water-injection mechanism 3 comprises a third inner tube 31, the third inner tube 31 is provided with a third outer pipe upper joint 32, there is a ninth gap 314 between the third inner tube 31 and the third outer pipe upper joint 32, the third outer pipe upper joint 32 is screwed with a second upper telescopic outer tube 33, there is a tenth gap 315 between the second upper telescopic outer tube 33 and the inner third tube 31, the second upper telescopic outer tube 33 is equipped with a second upper mandrel 34, the second upper mandrel 34 is screwed to a second branch body 36, the shoulder of the third inner tube 31 is equipped with a limiting spline 35, the limiting spline 35 is used to block the second branch body 36, the second branch body 36 is fixed by the thread fit of a overcurrent cap 37 with the third inner tube 31, the second branch body 36 has several second water injection overflow holes 318 evenly distributed along the circumferential direction, the second branch body 36 is screwed with a second lower mandrel 38, there is an eleventh gap 316 between the second lower mandrel 38 and the third inner tube 31, the second lower mandrel 38 is equipped with a second lower telescopic outer tube 39, there is a twelfth gap 319 between the second lower telescopic outer tube 39 and the inner third tube 31.

In this embodiment, during synchronizing water injection, water enters the subsequent water-injection mechanism 3 through the fifth gap 219, the sixth gap 220 between the first working cylinder 24 and the second inner pipe upper joint 21, the first water injection hole 223 along the axis of the first shunt body 28, the seventh gap 224 and the second inner tube between the second inner tube lower joint 210, and the eighth gap 225 between second inner tube lower joint 210 and first lower telescopic outer tube 211.

In water-injection mechanism 3, when water is injected in sections, water is injected into the destination segment through the ninth gap 314 between the third inner tube 31 and the third outer pipe upper joint 32, the tenth gap 315 between the third inner tube 31 and the second upper telescopic outer tube 33, the eleventh gap 316 between the third inner tube 31 and the second upper mandrel 34, diversion groove 317 on overcurrent cap 37, and second water injection overflow holes 318 on the second branch body 36 in circumferential direction. Other sections of water pass through the diversion groove 317 on the overcurrent cap 37, the eleventh gap 316 between the third inner tube 31 and the second branch body 36, the second lower mandrel 38, and the twelfth gap 319 between the third inner tube 31 and the second lower telescopic outer tube 39.

In order to improve the use effect of the second water injection overflow hole 318, please refer to FIG. 12 and FIG. 13, in a preferred embodiment, the second branch body 36 has at least four second water injection overflow holes 318 evenly distributed along the circumferential direction.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for segmented simultaneous water injection and oil recovery through double pipes in horizontal section, comprising a plurality of packers, a plurality of oil-extracting mechanisms and a plurality of water-injection mechanisms, wherein each of the plurality of packers, each of the plurality of oil-extracting mechanisms, and each of the plurality of water-injection mechanisms has an injection channel and a production channel, when the plurality of packers, the plurality of oil-extracting mechanisms and the plurality of water-injection mechanisms are combined, each of the injection channels is connected in turn, and each of the production channels is also connected in turn, the plurality of oil-extracting mechanisms extract oil through the production channels, the plurality of water-injection mechanisms inject water through the injection channels, wherein, each of the plurality of oil-extracting mechanisms is arranged between two adjacent packers, and each of the plurality of water-injection mechanisms is also arranged between two adjacent packers;

wherein each of the plurality of packers comprises a central tube and a first inner tube, two ends of the central tube are respectively connected with a first inner tube upper joint and a first inner tube lower joint, a first outer pipe upper joint is fixed on a shoulder of the first inner tube upper joint, a first gap is defined between the first outer pipe upper joint and the first inner tube upper joint, a plurality of first flow holes are defined in the first inner tube upper joint, the plurality of first flow holes are used to connect a second gap between the central tube and the first inner tube, the first inner tube lower joint is provided with a second flow hole, the central tube is provided with an expandable cartridge, both ends of the expandable cartridge are respectively connected with a rubber barrel upper sheath and a rubber barrel lower sheath with threads, a third gap is formed between the central tube and the expandable cartridge, the first outer pipe upper joint is arranged in the rubber barrel upper sheath, a first outer pipe lower joint is arranged in the rubber barrel lower sheath, a fourth gap is formed between the first outer pipe lower joint and the first inner tube lower joint, two ends of the central tube are respectively distributed with at least one hole along the circumferential direction, and corresponding two ends of the first inner tube are provided with a plurality of lobes, a diversion hole is defined in each of the plurality of lobes, a set and lock capsule is installed outside the diversion hole, and the set and lock capsule is pressed by a thread engagement of a capsule bolt and a capsule cap, and the set and lock capsule is used to seal each of the plurality of diversion holes, a plurality of unsealing pins are installed on the rubber barrel lower sheath, and the plurality of unsealing pins fit with corresponding grooves defined in the first outer pipe lower joint.

2. The system for segmented simultaneous water injection and oil recovery through double pipes in horizontal section according to claim 1, wherein at least six first flow holes are defined in the first inner tube upper joint.

3. The system for segmented simultaneous water injection and oil recovery through double pipes in horizontal section according to claim 1, wherein the rubber barrel lower sheath is provided with at least six unsealing pins.

4. The system for segmented simultaneous water injection and oil recovery through double pipes in horizontal section according to claim 1, wherein both ends of the corresponding first inner tube are provided with at least three lobes.

5. The system for segmented simultaneous water injection and oil recovery through double pipes in horizontal section according to claim 1, wherein the oil-extracting mechanism comprises a second inner pipe upper joint, a second inner tube lower joint, and a second outer pipe upper joint, the second inner pipe upper joint is screwed with a first shunt body, the second inner pipe upper joint is sleeved with a first upper telescopic outer tube, a fifth gap is defined between the second inner pipe upper joint and the first upper telescopic outer tube, the second outer pipe upper joint is screwed with the first upper telescopic outer tube, the first upper telescopic outer tube is equipped with a first working cylinder, the first working cylinder is screwed with the first shunt body, a sixth gap is defined between the first working cylinder and the second inner pipe upper joint, the second inner tube lower joint is screwed with the first shunt body, the first shunt body is screwed with the first working cylinder, and a seventh gap is defined between the first working cylinder and the second inner tube lower joint, the first working cylinder is equipped with a first lower telescopic outer tube, an eighth gap is defined between the first lower telescopic outer tube and the second inner tube lower joint, the first shunt body is provided with a plurality of oil production valve holes along the axial direction, a plurality of first water injection holes are symmetrically distributed on both sides of the oil production valve holes, the oil production valve holes are connected to oil overflow holes arranged in the circumferential direction, the oil production valve hole is equipped with a spring cap, and the spring cap presses a spring and a ball, the spring cap is screwed with the first shunt body.

6. The system for segmented simultaneous water injection and oil recovery through double pipes in horizontal section according to claim 5, wherein the first shunt body is provided with at least two oil production valve holes along the axial direction.

7. The system for segmented simultaneous water injection and oil recovery through double pipes in horizontal section according to claim 5, wherein at least ten first water injection holes are symmetrically distributed on both sides of the oil production valve hole.

8. The system for segmented simultaneous water injection and oil recovery through double pipes in horizontal section according to claim 5, wherein the water-injection mechanism comprises a third inner tube, the third inner tube is provided with a third outer pipe upper joint, a ninth gap is defined between the third inner tube and the third outer pipe upper joint, the third outer pipe upper joint is screwed with a second upper telescopic outer tube, a tenth gap is defined between the second upper telescopic outer tube and the third inner tube, the second upper telescopic outer tube is equipped with a second upper mandrel, the second upper mandrel is screwed to a second branch body, a shoulder part of the third inner tube is equipped with a limiting spline, and the limiting spline is used to block a second branch body, the second branch body is fixed by an overcurrent cap and the thread of the third inner tube, the second branch body has a plurality of second water injection overflow holes evenly distributed along the circumferential direction, the second branch body is connected with a second lower mandrel thread, an eleventh gap is defined between the second lower mandrel and the third inner tube, the second lower mandrel is equipped with a second lower telescopic outer tube, a twelfth gap is defined between the second lower telescopic outer tube and the third inner tube.

9. The system for segmented simultaneous water injection and oil recovery through double pipes in horizontal section according to claim 8, wherein the second branch body has at least four second water injection overflow holes evenly distributed along the circumferential direction.

* * * * *